United States Patent [19]

Lewis

[11] 4,215,285
[45] Jul. 29, 1980

[54] SPLASH SHIELD FOR ELECTRIC MOTOR

[75] Inventor: John G. Lewis, St. Louis, Mo.

[73] Assignee: Emerson Electric Co., St. Louis, Mo.

[21] Appl. No.: 929,516

[22] Filed: Jul. 31, 1978

[51] Int. Cl.$^2$ .............................................. H02K 7/08
[52] U.S. Cl. ..................................... 310/90; 310/211; 308/125
[58] Field of Search ................... 310/90, 261, 85, 262, 310/88, 264, 183, 265, 197, 211, 182; 308/125; 184/6, 6.27, 63

[56] References Cited

U.S. PATENT DOCUMENTS

| | | |
|---|---|---|
| 2,856,548 | 10/1958 | Krebs .................................. 310/90 |
| 2,945,729 | 7/1960 | Mitchel .............................. 310/90 |
| 3,378,709 | 4/1968 | Royer ................................. 310/90 |
| 3,846,652 | 11/1974 | Lykes ................................ 310/90 |
| 3,885,176 | 5/1975 | Cunningham ..................... 308/125 |

*Primary Examiner*—R. Skudy
*Attorney, Agent, or Firm*—Polster, Polster and Lucchesi

[57] ABSTRACT

A splash shield for an electric motor, particularly a squirrel cage motor with a die cast rotor. The rotor has a circular flange extending endwise from one or both end faces of the rotor. Each of these flanges is intergally die cast with the end ring of the rotor body so as to surround and to overlie an oil reservoir within the motor thereby to sling or otherwise deflect water which is splashed into the motor away from the oil reservoir.

4 Claims, 3 Drawing Figures

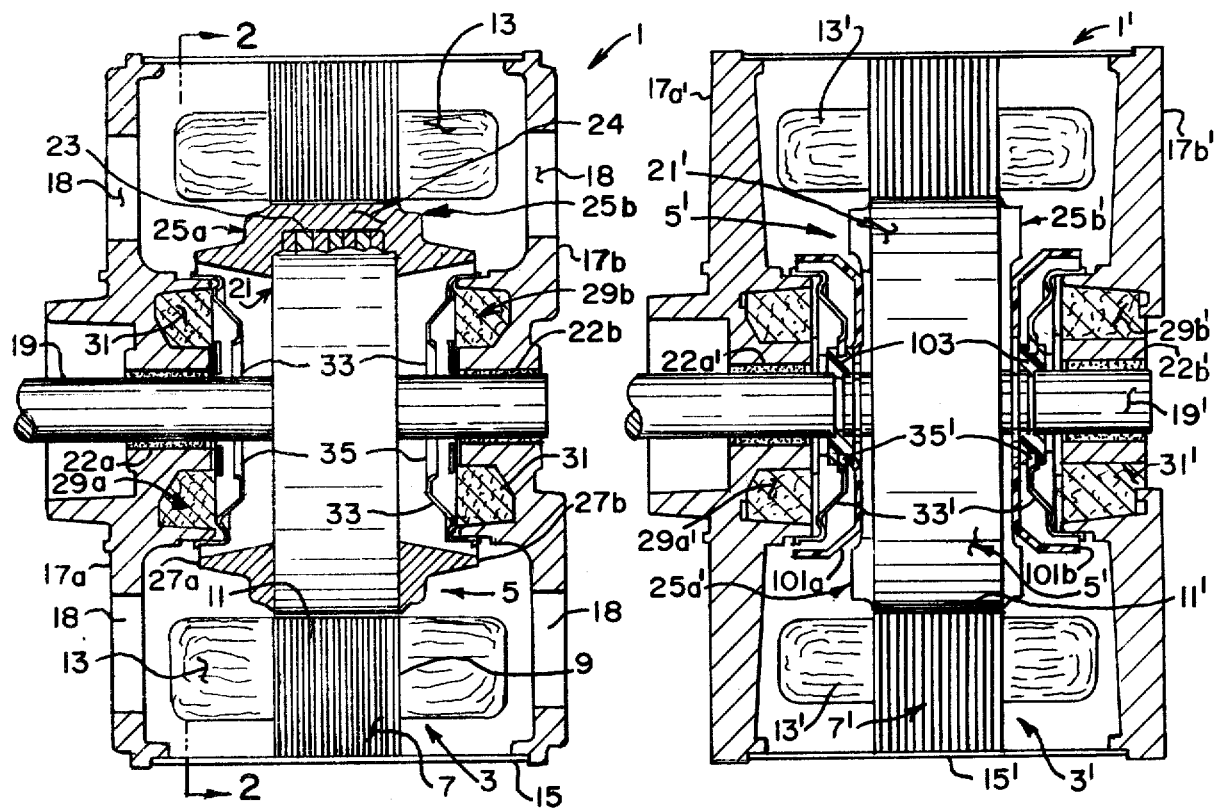
FIG. 1.
FIG. 3.
PRIOR ART
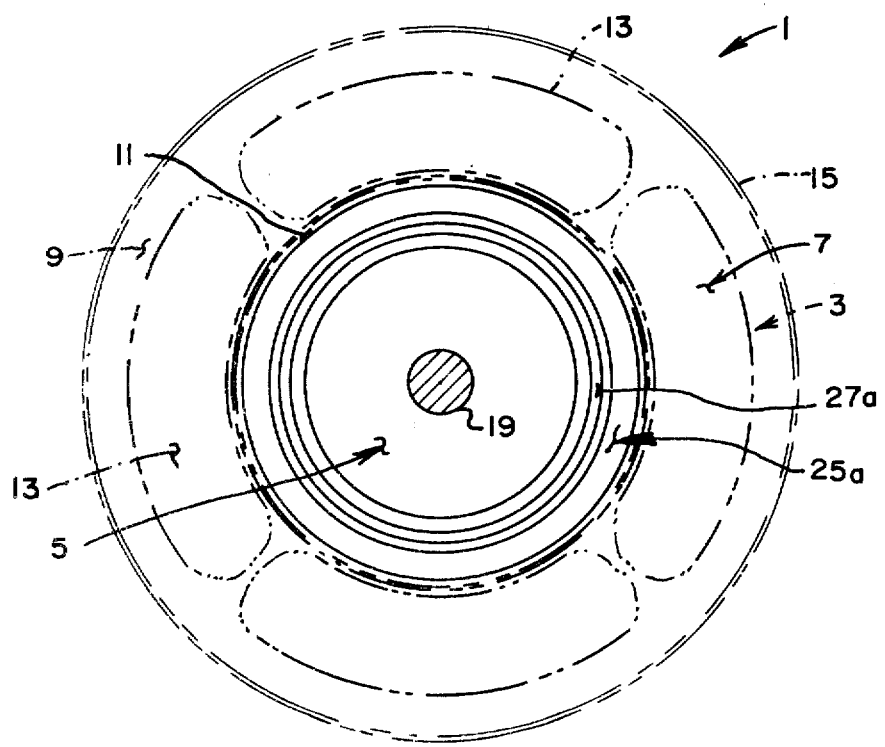
FIG. 2.

SPLASH SHIELD FOR ELECTRIC MOTOR

BACKGROUND OF THE INVENTION

This invention relates to electric motors and more particularly to a splash shield or splash guard for an electric motor which inhibits the entrance of water into the lubricant reservoir of the motor.

Electric motors used in such out of door applications as swimming pool pump motors and air conditioner condenser fan motors typically have a separate splash guard or water shield mounted on the rotor shaft within the body of the motor. These prior art splash guards were rotatable with the rotor shaft and had a flange extending around the oil reservoir cover. Reference may be made to FIG. 3 of the drawings herein for a view of a typical prior art water splash shield used in many motor applications.

However, in certain motor designs, the space within the motor shell adjacent the oil reservoir is so limited as to prevent the use of the separate, prior art splash shield. Also, the requirement of having to manufacture and to install a separate part (i.e., the splash shield) significantly added to the complexity and to the cost of manufacturing the motor.

SUMMARY OF THE INVENTION

Among the several objects and features of this invention may be noted the provision of a splash shield for inhibiting the entrance of water into the lubricating oil reservoir of an electric motor;

The provision of such a splash shield which is intregally cast as a part of the end rings of a die cast squirrel cage rotor assembly thus eliminating the requirement of manufacturing and installing a separate part on the motor;

The provision of such a splash shield which rotates with the rotor assembly and which slings water outwardly away from the lubricating oil reservoir during operation of the motor;

The provision of such a splash shield which is compact and which can be used in motors having insufficient internal space for accommodating prior art splash shields; and The provision of such a splach shield which simplifies the construction and assembly of a motor, which enables the motor to be less expensively manufactured, and which results in a relatively long service life for the motor.

Briefly, in an electric motor, particularly a squirrel cage motor, the motor includes a stator assembly including a stator core having a bore therethrough. A pair of end shields is secured either to the opposed ends of the stator assembly or to the ends of a tubular shell enclosing the stator assembly. The motor also includes a rotor assembly having a rotor shaft extending out through at least one of the end shields. Each end shield houses a bearing for journalling the rotor shaft therein. The rotor assembly further includes a rotor affixed to the shaft, the rotor being located within the bore of the stator core for rotation therewithin. The motor further has a reservoir adjacent each bearing for supplying lubricant to the bearing during operation of the motor. A continuous flange is provided on at least one end face of the rotor body facing toward the bearing, this flange being substantially concentric with the shaft and being disposed on the outside of the lubricant reservoir and extending in endwise direction from the rotor toward the end shield a distance sufficient to substantially overlie the lubricant reservoir thereby to inhibit water from entering the lubricant reservoir and carrying lubricant from the reservoir.

Other objects and features of this invention will be in part apparent and in part pointed out hereinafter.

BRIEF DESCRIPTION OF THE DRAWINGS

FIG. 1 is a longitudinal cross-sectional view of a squirrel cage electric motor illustrating a die cast rotor assembly having a splash shield of the present invention integrally die cast thereon for inhibiting the entrance of water into the lubricant reservoir of the motor upon water being splashed onto the motor;

FIG. 2 is an end view of the rotor assembly taken along lines 2—2 of FIG. 1 further illustrating the splash shield with the stator assembly and windings being illustrated in phantom; and FIG. 3 is a view similar to FIG. 1 illustrating a typical prior art splash shield installed in a motor.

Corresponding reference numbers indicate corresponding parts throughout the several views of the drawings.

DESCRIPTION OF A PREFERRED EMBODIMENT

Referring now to the drawings, an electric motor, such as a split phase squirrel cage motor, is indicated in its entirety at 1 and is shown to comprise a stator assembly generally indicated at 3 and a rotor assembly generally indicated at 5.

The stator assembly comprises a stator core 7 made up of a stack of soft iron plates or laminations 9 having a central bore 11 extending therethrough. As is conventional, these laminations each have a plurality of open mouth receptacles extending radially from bore 11 and aligned axially with one another to form a plurality of slots (not shown). A plurality of windings 13 are inserted in these slots so as to constitute the windings of the motor, the windings having a plurality of end turns along each end face of the stator core. The stator assembly further may include a cylindric shell or housing 15 surrounding the stator core and extending endwise out beyond the end turns of windings 13. As is conventional, an end shield 17a, 17b is secured to each end of shell 15 by means of through bolts (not shown) extending lengthwise through the motor. Typically, end shields 17a, 17b have a plurality of openings 18 formed or cast therein so as to permit cooling air to circulate freely through the motor.

Rotor assembly 5 comprises an elongate rotor shaft 19 and a rotor 21 affixed to the shaft. The rotor shaft is adapted to be journalled in bearings 22a, 22b carried by their respective end shields 17a or 17b. As shown, one end of shaft 19 extends out beyond one of the end shields. This shaft may carry a pulley or the like (not shown) so as to constitute a power output shaft for the motor.

As is conventional, the rotor bars of a squirrel cage motor are made of die cast aluminum or other suitable metal. Typically, the rotor includes a stack of laminations 23 (see FIG. 1) constructed from magenetic material having a plurality of receptacles formed in their outer margins and aligned to define slots for the rotor bars, as indicated at 24. The slots are generally in line with one another (or may be slightly skewed relative to one another) so as to form longitudinal openings through the stack. Upon die casting the rotor body, molten aluminum is forced through the slots to form solid metal rotor bars 24 and thus the rotor bars are die cast in-place within the slots of the rotor. At each end face of the rotor, end rings, as indicated at 25a, 25b, are die cast in place with the rotor so as to electrically short circuit the ends of the rotor bars. In the past, it has been conventional to cast a plurality of spaced fan blades integrally with the end rings for circulating air within the motor. The invention disclosed hereinafter is both functionally and structurally different from these prior art rotor fan blades.

As shown in FIGS. 1 and 2, and as in accordance with this invention, end rings 25a, 25b are formed so as to include a continuous flange 27a, 27b, respectively. In the embodiment illustrated, the flanges 27a, 27b extend around the end face of the rotor and are concentric with the longitudinal centerline of the rotor (i.e., with shaft 19). These flanges extend axially outwardly from their respective end faces of rotor 21 for purposes as will appear. While the flanges are described as extending from both end faces of the rotor 21, those skilled in the art will recognize that in some applications of this invention, only a single flange at only one end of the rotor 21 need be utilized.

Each end shield 17a, 17b may include a lubricant reservoir 29a, 29b adjacent a respective bearing 22a or 22b for supplying a suitable lubricant or oil to the bearings thereby to insure a long service life for the motor. Each lubricant reservoir 29a or 29b comprises a body of suitable wick material 31 installed in a suitable opening formed within the end shield. At selected locations around shaft 21, the wick material communicates with the bearings so as to feed lubricant to the bearings and motor shaft. A snap-in-place sheet metal cap 33 is attached to the end shield to hold the wick material in place and to collect oil dropped from the shaft and to return it to the wick material. Cap 33 has a central opening 35 therethrough for receiving shaft 19, this central opening is defined by an inwardly turned lip 37 on the end cap. As noted above, motor 1 herein illustrated has two end shields 17a and 17b which each contain a respective oil reservoir 29a, 29b. In regard to this invention, end shields 17a, 17b only provide the support for the oil reservoir, but it will be understood that the oil reservoir may be supported by other structures. Further, only one oil reservoir need be provided in certain motor applications.

In accordance with this invention, end ring flanges 27a, 27b extend endwise from their respective end rings 25a, 25b a distance sufficient so as to surround and to at least partially overlie opening 35 in cap 33. More specifically, flanges 27a, 27b extend outwardly toward their respective end shields 17a, 17b well past opening 35 in cap 33. With rotor body 21 rotating during operation of the motor, substantially all water that may be splashed into the interior of the motor through openings 18 in end shields 17a, 17b will encounter flanges 27a, 27b and will be slung outwardly by the rotating flanges or will otherwise deflected away from opening 35 in cap 33 thereby to inhibit the introduction of water into the lubricant reservoir. Thus, end ring flanges 27a, 27b each constitute a splash shield or an "umbrella" for protecting the lubricant reservoir from the entrance of water and for inhibiting water from carrying away the lubricant.

Of course, since the splash shield flanges 27a, 27b are intregally cast with the die cast portion of the rotor 21, they form a one piece unit together with the rotor which may be readily manufactured in the same manufacturing process as the rotor and may be installed together with the rotor as a one piece unit in the motor thus simplifying the manufacture and assembly of the motor with a consequent reduction in the cost of the motor.

Referring now to FIG. 3, a pair of typical prior art splash shields 101a and 101b is shown installed in an electric motor similar to motor 1 heretofore described. The "primed" reference characters indicated parts having a function and construction similar to the parts heretofore described in regard to FIGS. 1 and 2. As shown, prior art splash shield 101a is a separate one piece member affixed to shaft 19' between bearing 22a' and rotor body 21' and splash shield 101b affixed to the shaft is between bearing 22b' and body 21'. Typically, these prior art splash shields were injection molded of a suitable synthetic resin material, such as a glass fiber filled nylon resin or the like. While it can be seen that both the splash shield of the present invention and the prior art splash shield do essentially the same function (i.e., keep water splashed onto the end shields of the motor from entering the lubricating reservoir), the prior art splash shields require significantly more space within the motor. For example, the mounting boss 103 of the prior art splash guard 101a or 101b occupies a considerable length on shaft 19' and must be rigidly affixed (keyed) thereto so as to rotate with the shaft. Also, the prior art splash shield must be manufactured separately from the rotor body, must be separately fitted on the shaft 19' during assembly of the motor, and must be separately secured in place on the shaft.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. In an electric motor comprising a stator assembly including a stator core, a bore through said core, an end shield operatively attached to each end of said stator assembly, a rotor assembly including a rotor shaft and a rotor affixed to and rotatable with said shaft, said rotor being rotatable with the bore of said stator core, bearing means supported by said end shields for journalling said rotor shaft, and a lubricant reservoir adjacent at least one of said bearing means and surrounding said rotor shaft for supplying lubricant to said one bearing means, wherein the improvement comprises: means for inhibiting water splashed into said motor from entering said lubricant reservoir, said splash inhibiting means including a continuous flange carried by said rotor at one end thereof and facing toward said one bearing means, said flange being concentric with said rotor shaft, being disposed on the outside of said lubricant reservoir, and extending endwise from said rotor a distance sufficient to surround and to substantially overlie said lubricant reservoir.

2. In an electric motor as set forth in claim 1 wherein said rotor is a die cast squirrel cage rotor having an end ring, and wherein said flange is intergally die cast with said rotor and forms a part of the end ring of the rotor.

3. In an electric motor as set forth in claim 1 having a lubricant reservoir for each of said bearings, said rotor having one of said flanges on each end face thereof so as to at least substantially protect each of said lubricant reservoirs from having water splashed therein.

4. A rotor for a squirrel cage electric motor, the latter having one or more bearings for journalling said rotor within said motor and a lubricant reservoir adjacent a respective bearing for supplying lubricant to its respective bearing, said rotor being of die cast construction and having a plurality of rotor bars of die cast metal extending substantially longitudinally therethrough and an integrally die cast end ring at each end of the rotor for short circuiting each of said rotor bars, at least one of said end rings having a water splash shield integrally cast therewith, said water splash shield being concentric with the longitudinal axis of said rotor and having a continuous surface, said water splash shield further extending endwise from said rotor a distance sufficient to permit such continuous surface to inhibit the splashing of water into said lubricant reservoir when said rotor is mounted in a motor and when said reservoir is at least partially surrounded within said water splash shield.

* * * * *